United States Patent

Wejrock et al.

[11] Patent Number: 5,256,366
[45] Date of Patent: Oct. 26, 1993

[54] METHOD OF MOLDING FIBERGLASS

[76] Inventors: Richard Wejrock, P.O. Box 733, Hollywood, S.C. 29449; Allen T. Curry, 629 Parish Rd., Charleston, S.C. 29401

[21] Appl. No.: 638,549

[22] Filed: Jan. 8, 1991

[51] Int. Cl.$^5$ .................. B29C 43/18; B29C 43/56
[52] U.S. Cl. .................... 264/510; 264/101; 264/255; 264/257; 264/554; 264/571; 264/DIG. 50; 264/DIG. 78; 425/388; 425/405.1; 425/DIG. 60
[58] Field of Search ............... 264/510, 511, 553, 571, 264/257, 258, 102, 101, 554, 255, DIG. 50, DIG. 78; 425/388, 405.1, DIG. 60

[56] References Cited

U.S. PATENT DOCUMENTS 2,841,823  7/1958  Van Hartesveldt ............... 425/446
4,312,829  1/1982  Fourcher ............................ 264/313

Primary Examiner—Jay H. Woo
Assistant Examiner—James Mackey
Attorney, Agent, or Firm—B. Craig Killough

[57] ABSTRACT

A fiberglass molding method characterized by the use of a male mask to which glass fiber material is affixed and then sealed against a female mold by a vacuum actuated gasket system. Resin is placed into the bottom of the female mold and is pulled by vacuum through the glass fiber material by means of vacuum ports which extend through the bottom of a spillway and open at an elevation above the bottom of the spillway. The method also allows the resulting fiberglass part to be subsequently surfaced coated using the vacuum method.

8 Claims, 4 Drawing Sheets

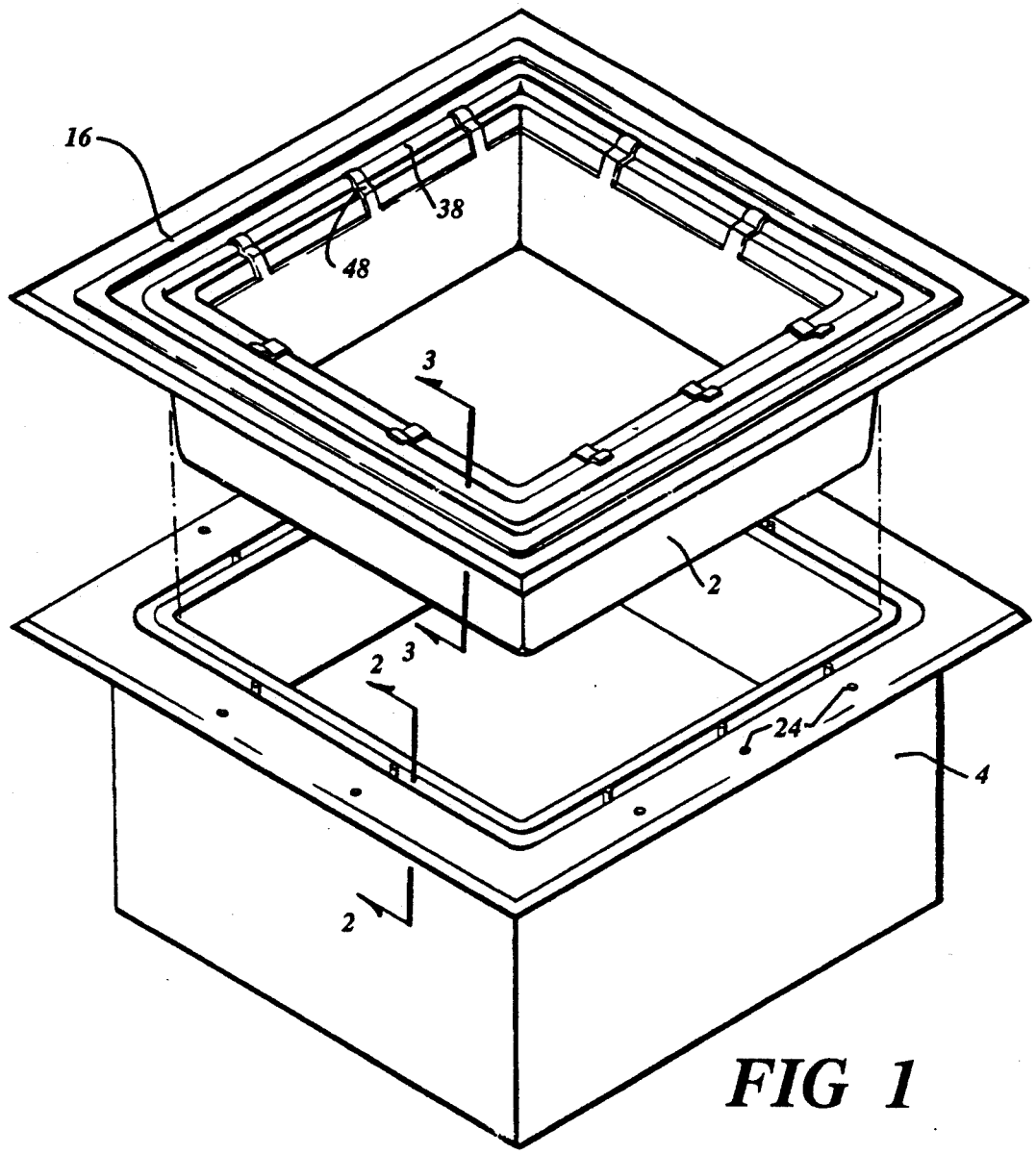
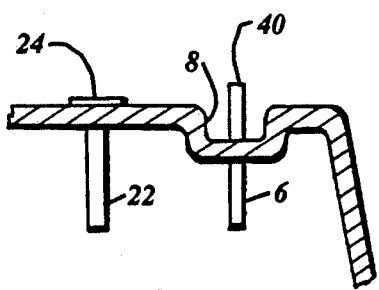
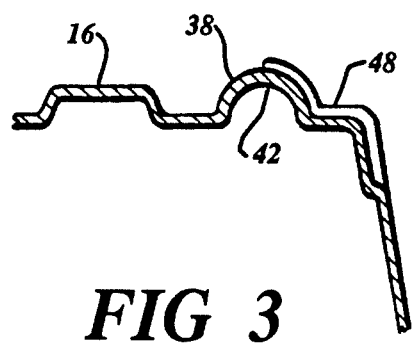
FIG 1
FIG 2
FIG 3

METHOD OF MOLDING FIBERGLASS

FIELD OF THE INVENTION AND BACKGROUND OF THE INVENTION

This invention relates to fiberglass generally, and is more specifically directed to a method and apparatus for molding fiberglass and fiberglass parts.

Various methods of fiberglass part manufacturing are known in the art. These means have in common the use of glass fiber shaped as desired and then impregnated with a resin which hardens to cause the glass fiber to retain its desired shape.

Various methods which are used in the prior art include resin transfer molding, sheet molding, and vacuum bagging. These methods may require expensive metal molds or epoxy molds, such as with resin transfer molding, or high energy costs, such as with sheet molding.

Various methods have used vacuum to draw resin through glass fiber. However, such devices and methods have been less than satisfactory.

SUMMARY OF THE PRESENT INVENTION

The present invention uses a vacuum to seal the perimeter of a male mask z and a female mold 4 where the male mask and female mold join. A separate vacuum control is then used to draw catalyzed resin from the bottom of the female mold up through the glass fiber. Multiple vacuum ports are strategically located within a spillway, through which a vacuum is introduced to control the flow of the resin through the glass fiber. The use of this part vacuum system, which is separate from the vacuum sealing means, allows control of the resin flow and insures uniform part thickness, and complete resin penetration of the glass fiber which is located within the part cavity of the apparatus, even when ribs or other reinforcing structures are incorporated into the part.

Glass fiber a required is removably attached to the male mask. Catalyzed resin is poured into the female mold, which may be gel coated. The male mask 2 is then placed over and into the female mold 4.

Vacuum is applied to the perimeter gasket system. This vacuum causes the male mask to be completely and finally pulled down against the sealing planes of the female mold.

Vacuum is applied to the part vacuum system to pull the resin from the bottom of the mold up the sides of the mold, to fully penetrate the glass fiber and/or coring material. The part vacuum is applied independently of the sealing vacuum, and the part vacuum is controlled to insure that the resin fully penetrates the glass fiber.

A resin is pulled through the glass fiber and the glass fiber begins to be fully impregnated with the resin, excess resin collects in the spillway trough, but does not block the vacuum ports, since the resin seeks the lowest level.

DESCRIPTION OF THE DRAWINGS

FIG. 1 is a perspective view of the male mask exploded away from the female mold.

FIG. 2 is a sectioned view taken essentially along line 2—2 of FIG. 1.

FIG. 3 is a sectioned view taken essentially along line 3—3 of FIG. 1

DETAILED DESCRIPTION OF THE PREFERRED EMBODIMENT

A. The Fiberglass Molding Apparatus

Figure 4:
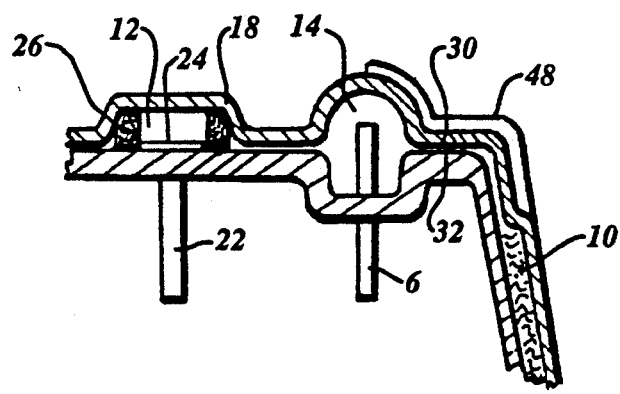
FIG. 4 is a sectioned view taken along the same section lines as FIGS. 2 & 3, showing the section of the male mask as it joins the corresponding section of the female mold, with gasket materials in place, and the glass fiber material located with the main part Vacuum cavity 10.

Referring now to the drawings, the device uses a male mask 2 and a female mold 4. FIG. 1. The male mask and female mold are manufactured to the desired shape. The male mask and the female mold may be made of silicone, urethane, polyester, or other materials suitable for fiber glass manufacture which are relatively inexpensive materials capable of being easily manufactured to the desired shape and dimensions. Since the device uses relatively low and controlled vacuum, rather than high pressure to transport the resin, it is not necessary to use expensive matched metal or epoxy molds which will tolerate high pressures, although molds of these materials could be used.

The male mask 2 rests over the female mold 4 leaving a main part cavity 10 of the desired thickness. FIG. 4. The male mask and the female mold come into contact with each so as to create a perimeter gasket chamber 12 and a main part vacuum chamber 14.

The perimeter gasket chamber 12 runs about the perimeter 16 of the male mask and the female mold so as to provide an overall seal of the mold upon introduction of a vacuum as will be seen. The perimeter gasket chamber vacuum seals the apparatus, and uses vacuum to hold the male mask in its proper position over and within the female mold.

An inner gasket 18 and an outer gasket 26 are affixed to the male mask or the female mold. A space exists between the inner gasket and the outer gasket so as to form the perimeter gasket chamber 12. In the preferred embodiment, these gaskets may be foam gaskets, and are attached to the male mask, although other gasket materials could be used in any manner which will allow the creation of a sufficient vacuum with the perimeter gasket chamber 12.

The perimeter gasket chamber is located over a series of perimeter gasket vacuum ports 22 which may extend through the perimeter of the female mold. The openings 24 of the perimeter gasket vacuum ports are located within the perimeter gasket chamber.

The series of perimeter gasket vacuum ports 22 may be connected by means of a manifold to a vacuum pump. The vacuum pump is actuated so as to create a vacuum within the perimeter gasket chamber, causing the male mask to be drawn against the female mold in its proper position and alignment for use of the mold apparatus. The mold is now sealed so that the main part vacuum chamber will function properly, and independently of perimeter seal.

In the preferred embodiment, internal flanges 30 are present on the male mask which come into contact with sealing planes 32 of the female mold as vacuum is applied to the perimeter gasket vacuum system as described above. This contact further seals the perimeter, and also creates the main part vacuum chamber 14, which is now a totally independent vacuum chamber. A part height allowance area 34 is also formed where the male mask meets the female mold adjacent to the part cavity. In addition to further insuring the vacuum integrity along the upper perimeter of the part cavity, tis part height allowance also acts somewhat as a vehicle for allowance of minute male mask deflection.

The part vacuum chamber 14 is connected to a Vacuum manifold 36 Which works independently of the perimeter gasket vacuum system. The independent operation of the part vacuum system is necessary since the proper control of the transportation of the resin dictates that the vacuum be capable of variance during the use of the mold without allowing movement of the male mask.

The main part vacuum system is characterized by a continuous vacuum pain part chamber 14 which is present about the perimeter 38 of the male mask and female mold between the perimeter gasket chamber 12 and the part cavity 10. A series of vacuum ports 6 are present within the vacuum chamber 14, and are strategically located as required by the size and shape of the part, and as determined by experience with the particular part to be molded and empirical observation. The particular location of the individual ports is dictated by the complexity and cross sectional thickness of the parts to be molded, so that resin flows evenly throughout the part cavity to penetrate the glass fiber media slowly and completely.

The vacuum chamber has a trough shape which creates a resin spillway 8. As the vacuum pulls resin from the part cavity into the vacuum chamber, the spillway collects excess resin.

The individual ports 6 extend through the spillway 8 of the female mold so that the opening 40 of the ports 6 is well above the spillway. As excess resin flows into the spillway, the resin does not block the opening of the vacuum ports. The opening of the vacuum ports may extend almost to the top 42 of the rise of that portion of the vacuum chamber formed by the male mask, to maximally insure that there will be no blockage of the vacuum ports in the event a large amount of excess resin is present. Further, by locating the vacuum ports through the female mold, the male mask can be easily and properly located over and within the female mold, since no vacuum lines are attached to the male mask.

Figure 7:
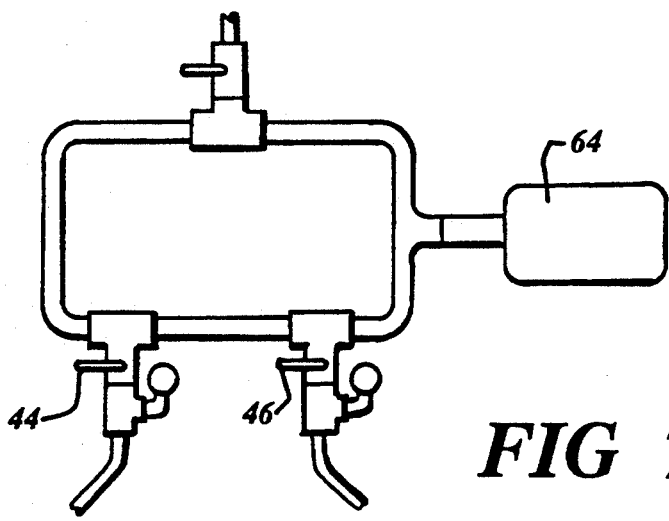
FIG. 7 is a partial view of two manifold systems showing separate controls for the gasket vacuum system and the part vacuum system.
Figure 8:
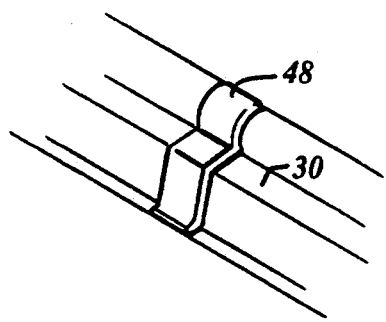
FIG. 8 is a partial view in perspective showing part bleeder duct 48.
Figure 9:
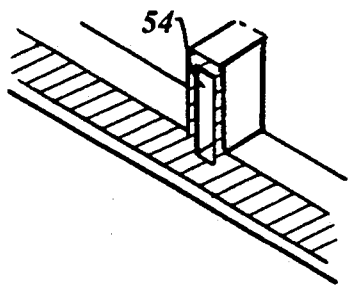
FIG. 9 is a partial view of a male mask incorporating a reinforcement chamber.
Figure 10:
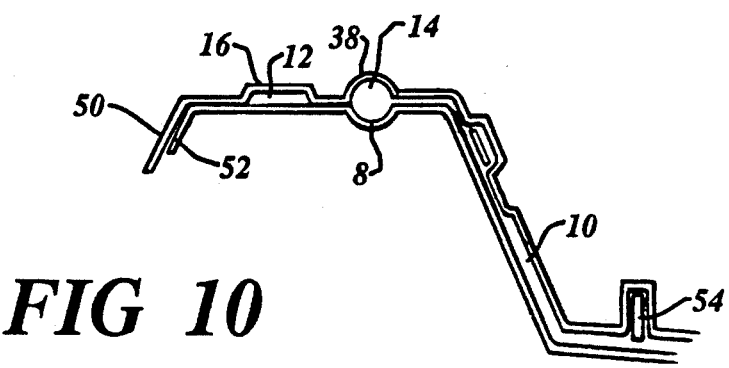
FIG. 10 is a sectioned view showing the relationship of the elements of the male mask and the female mold.

A manifold system which is separate from that used with the perimeter gasket is used for the part vacuum system. Accordingly, separate control devices 64 and valves 44, 46 are available to control the vacuum which is present for the part vacuum system independently of the vacuum which is present for the perimeter gasket. FIG. 7.

In the preferred embodiment, vacuum is transferred from the vacuum chamber to the part cavity by means of a series of ducts 48. The number of ducts to be used, and the size of the individual ducts, is determined by the size, shape, and thickness of the part to be molded through experience and empirical observation. The size of the openings of the ducts will determine the velocity of air extracted from the cavity, and in this manner, the transportation of resin through the part cavity is also controlled. As the part cavity is evacuated of air, the resin is drawn through the glass in the part cavity, the ducts act to transport excess resin from the part and part cavity into the resin spillway.

The device may incorporate canted flanges 50, 52 or similar locating means. The canted flanges allow for proper initial and final location of the male mask over and within the female mold. This alignment means insures that the perimeter gasket vacuum ports 22 are properly located within the perimeter gasket chamber 12, without subsequent manual alignment. As the perimeter vacuum system is actuated to fully and finally pull the male mask in position within the female mold by vacuum means, the alignment means aids in insuring that not only proper vacuum is present around the perimeter gasket 18, 26, but also that the male mask is properly aligned within the female mold to produce a properly dimensioned part cavity 10. The alignment dictates the dimensions of the part cavity, which controls the dimension of the resulting part. By proper alignment, the part which is produced within the part cavity has proper thickness and dimensional consistency.

The male mask may be constructed with voids 54 therein into which glass fiber or other materials, which could be wood, may be placed so as to create structural ribs or similar features without the necessity of separate molding or subsequent attachment of these parts. Likewise, scribe lines, cut lines, and undercuts may be incorporated into the male mask so as to yield these features in the resulting molded part.

Figure 5:
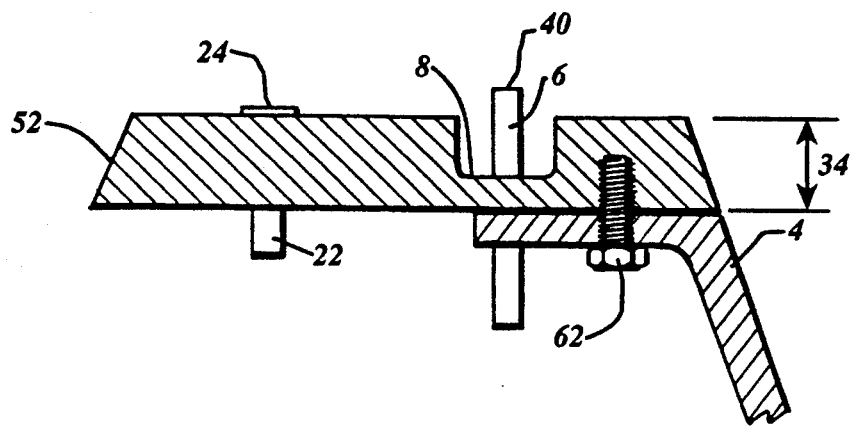
FIG. 5 is another embodiment of the structure of FIG. 2, wherein the alignment system 52, perimeter vacuum ports 22, resin spillway 8 and part vacuum ports 6 are incorporated into a unit which may be detached from the female mold.
Figure 6:
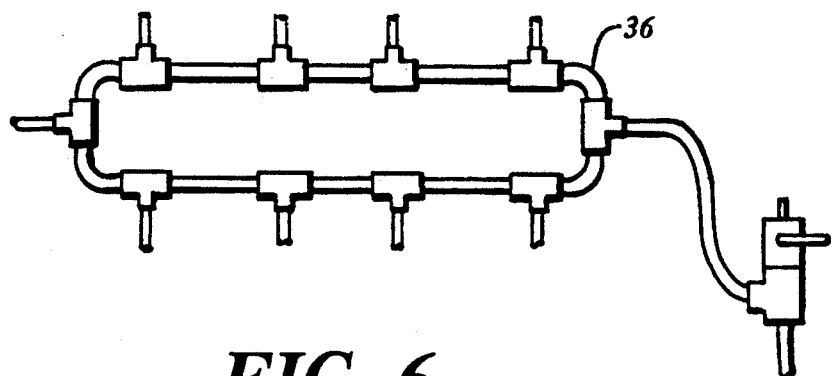
FIG. 6 is a partial view of the manifold system used for the main part vacuum system.

As shown in FIG. 5, the alignment system, perimeter vacuum ports, resin spillway, and part vacuum ports may be incorporated into a unit 60 which may be removably attached to various molds 4 by fastening means 62. In this manner, the unit may be attached to other molds, to capitalize on existing molds. Since the vacuum systems are incorporated into the female mold, additional flexibility is achieved with regard to the male mask. Male masks having different structural features, such as different scribe lines or rib structures, may be used with a single female mold. The present invention as disclosed in the preferred embodiment easily incorporates such a process since the vacuum systems are incorporated into the female mold.

B. Method for Molding Fiberglass Using the Mold

A release agent is applied to the female mold as known in the art. The female mold may or may not be gel coated prior to molding a part.

Figure 11:
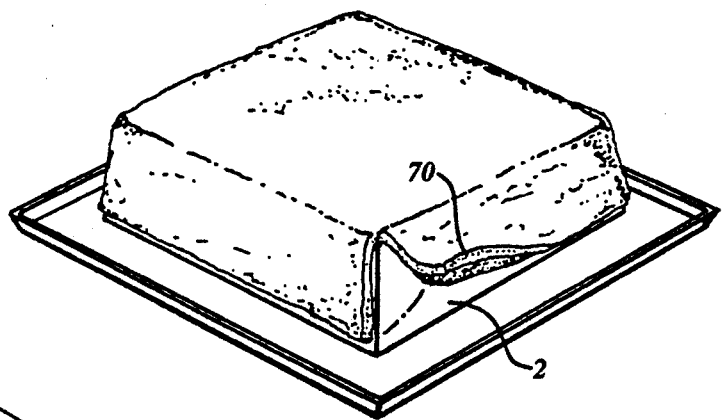
FIG. 11 shows the male mask in an inverted position with glass fiber attached to the male mask.

Pre-patterned, or pre-formed glass fiber 70 and or coring materials, dictated by desired cross sectional part thickness and structural reinforcement, i.e. voids, ribs, etc., are attached to the male mask by spray adhesives or binder systems known in the art. FIG. 11.

A predetermined quantity of resin is catalyzed and poured into the female mold. The quantity of catalyzed resin must be sufficient to fill the part cavity and saturate the glass fiber material which will be present in the part cavity. Only sufficient resin is present to permeate the glass fiber material, although complete precision in determining the amount of resin to be used is unnecessary, since excess resin will flow into the spillway. The design of the vacuum part system prevents the opening 40 of the vacuum ports from being obstructed as excess resin is pulled from the part cavity into the vacuum chamber.

The male mask 2 is located over the female mold 4, and is lowered into the female mold. The alignment system, such as the cant of the molds and mask flanges 50, 52, properly aligns the male mask and the female mold. The male mask is properly located to allow the perimeter vacuum system to finally position the male mask and the female mold relative to each other and to provide the required seal of the mold, without precise manual positioning. Likewise, dimensional stability of the part cavity 10, and accordingly, the resulting part, is achieved.

The perimeter gasket vacuum system is actuated, and air is evacuated from the perimeter gasket chamber through the perimeter gasket port(s). Ordinarily, it is not necessary that this vacuum be regulated during operation of the mold; it is only necessary that sufficient vacuum be maintained to hold the male mask in position relative to the female mold.

Figure 12:
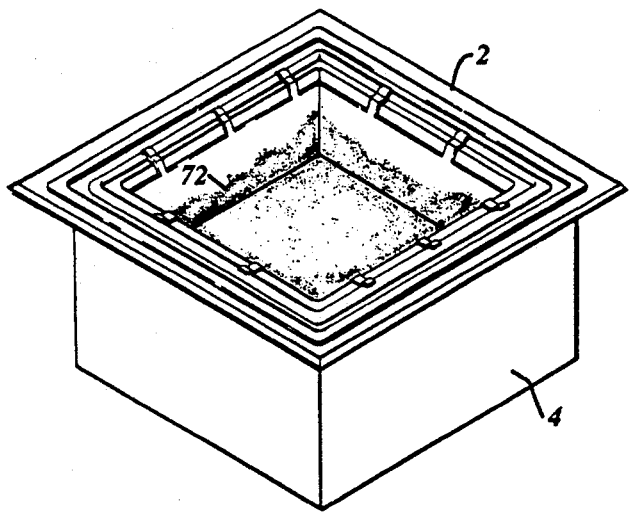
FIG. 12 demonstrates the flow of resin, illustrated by shading, as it travels through the main part cavity of the mold to penetrate the glass fiber.
Figure 13:
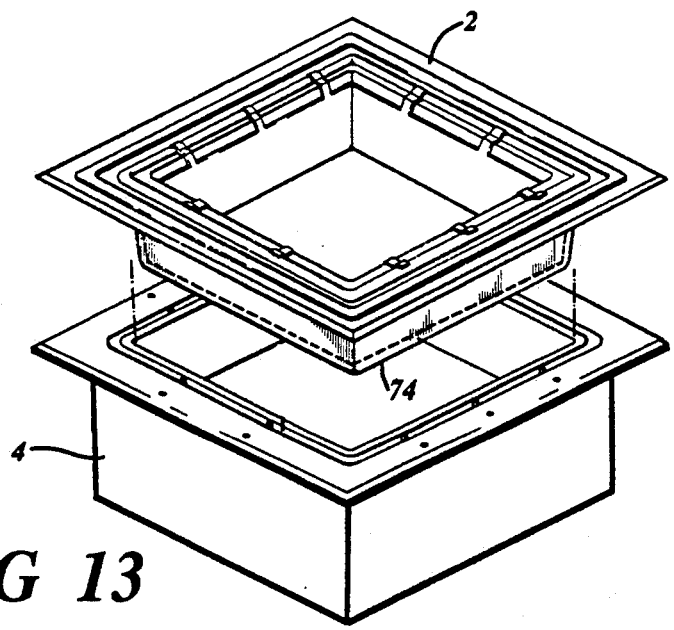
FIG. 13 is an exploded view demonstrating the fiberglass part attached to the male mask as the male mask is separated from the female mold.

The part vacuum system may now be actuated. Vacuum is achieved through the individual part vacuum ports, creating an evacuation of air and partial vacuum in the part vacuum chamber. The part vacuum ducts communicate with the part cavity, and draw air from the part cavity, pulling resin 72 from the bottom of the female mold up through the glass fiber and/or coring material. FIG. 12.

The operator may observe the flow of the resin through the glass fiber, since the male mask may be translucent. The evacuation of air from the part cavity must be controlled to insure proper flow of the resin through the glass fiber. For example, the flow of the resin must not create air pockets which are blocked by resin from the vacuum flow. The resin must flow slowly enough to insure that all air will be evacuated from the part cavity, which will result in the glass fiber being saturated with the resin.

Typically, the resin will flow up and through the part cavity 10. As the resin flows through part cavity 10, excess resin will finally flow through the bleeder ducts 48, and excess resin begins to be collected in the resin spillway 8. Once all of the glass fiber has been saturated, and the part cures, the vacuum source may be terminated to the part vacuum system, and then to the perimeter gasket vacuum system.

The male mask 2 may now be separated from the female mold 4. The male mask and the female mold may be separated by applying air pressure to force the male mask and the female mold apart.

Once the part has been molded there is a slight amount of shrinkage due to the nature of unsaturated polyesters as they go from gelation through peak exotherm to fully cured laminate. Due to shrinkage of the laminate, when the male mask is parted from the female mold, the part 74 will remain on the male mask. Any indentations molded in the part will further insure that the part stays intact with the male mask. The part is now present on the male mask, which allows for secondary surface coating, if desired. Secondary surface coating may be applied to the exterior of the part as desired before it is removed from the male mask. One way to apply such a coating is to introduce the desired surface coating to the female mold and then reseat the male mask to the female mold. The perimeter vacuum is actuated, and the main part vacuum system may be used to transport the surface coating in the same manner in which the resin is transported. As the surface coating flows out and up the surface of the female mold, the coating reproduces the exact finish of the female mold, while also filling all surface variations and imperfections of the structural part.

What is claimed is:

1. A method of fiberglass molding, comprising:
   a. removably affixing a glass fiber material to a male mask;
   b. pouring a resin material into a female mold;
   c. applying a vacuum to a gasket chamber formed within a perimeter gasket located between said male mask and said female mold so as to pull and seal said male mask against said female mold;
   d. applying a vacuum within a main part chamber formed between said male mask and said female mold, and inside of the perimeter of said perimeter gasket, so as to pull said resin by vacuum means through said glass fiber until said glass fiber is saturated with resin;
   e. terminating said vacuum to said main part chamber upon complete saturation of said glass fiber with resin, as resin begins to flow into a resin spillway;
   f. terminating said vacuum to said gasket chamber to release said male mask from said female mold;
   g. pulling said male mask from said female mold with a fiberglass part attached to said modem; and
   h. removing said fiberglass part from said male mask.

2. A method of fiberglass molding as described in claim 1, wherein said spillway is a continuous trough which runs about the perimeter of said female mold between said perimeter gasket and said main part chamber, and wherein at least two vacuum ports extend though a bottom of said spillway at predetermined intervals, having an opening on each of said vacuum ports which extends above said bottom of said spillway to allow resin to be collected in said spillway without blocking said opening to said vacuum ports.

3. A method of fiberglass molding as described in claim 1, wherein said perimeter gasket comprises an outer gasket, and an inner gasket, leaving a space between said outer gasket and said inner gasket so as to form said gasket chamber therebetween, and wherein at least one vacuum port extends through said female mold to allow said vacuum to be applied within said gasket chamber to pull said male mask against said female mold and to seal said perimeter gasket.

4. A method of fiberglass molding as described in claim 2, wherein said perimeter gasket comprises an outer gasket, and an inner gasket, leaving a space between said outer gasket and said inner gasket so as to form said gasket chamber therebetween, and wherein at least one vacuum port extends through said female mold to allow said vacuum to be applied within said gasket chamber to pull said male mask against said female mold and to seal said perimeter gasket.

5. A method of fiberglass molding as described in claim 1, further comprising the additional steps of:
   a. applying a coating or finish material to said female mold;
   b. placing said male mask with said fiberglass part attached thereto within said female mold;
   c. applying vacuum to said gasket chamber so as to pull said male mask against said female mold;
   d. applying a vacuum to said main part chamber so as to cause said coating or finish material to be applied to said fiberglass part by transporting said coating or finish material through said main part chamber by vacuum means until said fiberglass part is coated as desired;
   e. terminating said vacuum to said main part chamber and to said gasket chamber; and
   f. removing said male mask from said female mold.

6. A method of fiberglass molding as described in claim 2, further comprising the additional steps of:
   a. applying a coating or finish material to said female mold;
   b. placing said male mask with said fiberglass part attached thereto within said female mold;
   c. applying vacuum to said gasket chamber so as to pull said male mask against said female mold;
   d. applying a vacuum to said main part chamber so as to cause said coating or finish material to be applied to said fiberglass part by transporting said coating or finish material through said main part chamber by vacuum means until said fiberglass part is coated as desired;
   e. terminating said vacuum to said main part chamber and to said gasket chamber; and
   f. removing said male mask from said female mold.

7. A method of fiberglass molding as described in claim 3, further comprising the additional steps of:
   a. applying a coating or finish material to said female mold;
   b. placing said male mask with said fiberglass part attached thereto within said female mold;
   c. applying vacuum to said gasket chamber so as to pull said male mask against said female mold;
   d. applying a vacuum to said main part chamber so as to cause said coating or finish material to be applied to said fiberglass part by transporting said coating or finish material through said main part chamber by vacuum means until said fiberglass part is coated as desired;
   e. terminating said vacuum to said main part chamber and to said gasket chamber; and
   f. removing said male mask from said female mold.

8. A method of fiberglass molding as described in claim 4, further comprising the additional steps of:
   a. applying a coating or finish material to said female mold:
   b. placing said male mask with said fiberglass part attached thereto within said female mold;
   c. applying vacuum to said gasket chamber so as to pull said male mask against said female mold;
   d. applying a vacuum to said main part chamber so as to cause said coating or finish material to be applied to said fiberglass part by transporting said coating or finish material through said main part chamber by vacuum means until said fiberglass part is coated as desired;
   e. terminating said vacuum to said main part chamber and to said gasket chamber; and
   f. removing said male mask from said female mold.

* * * * *